Sept. 2, 1958   R. W. JENNINGS   2,850,300
RESILIENT-TONGUED CABLE CLAMP FOR BEVELED
CORNER OUTLET BOXES
Filed Dec. 20, 1956

INVENTOR.
RALPH W. JENNINGS,
BY

ATTORNEYS.

United States Patent Office 2,850,300
Patented Sept. 2, 1958

2,850,300

RESILIENT-TONGUED CABLE CLAMP FOR BEVELED CORNER OUTLET BOXES

Ralph W. Jennings, Topeka, Kans.

Application December 20, 1956, Serial No. 629,744

2 Claims. (Cl. 285—128)

This invention relates generally to electrical wiring devices, and more particularly has reference to a means facilitating the clamping of electrical cables in outlet boxes. Ordinarily, an electrical outlet box is formed with knockout portions, which are removed for the purposes of providing holes in the box through which cables are inserted. The conventional electrical outlet box includes a clamp, loosened by means of a clamp screw. As a result, it is necessary to loosen the clamp screw, pull in the cable, and then tighten the screw once again. This involves a considerable expenditure of time, so that the completion of wiring in the field, that is, in a house or other building structure, is often considerably delayed. The loosening of a clamp screw in every instance in which a cable is extended into an outlet box, and the retightening of the screw, obviously, prolongs the time required for a particular wiring operation to an undesirable extent.

The main object of the present invention, accordingly, is to provide a speed clamp for electrical outlet boxes, so designed that one need merely insert the cable through the knockout hole, the insertion of the cable being adapted to cause the cable to be automatically clamped in place within the outlet box. The necessity of loosening and retightening clamp screws is thus completely avoided, so that the overall time required for a particular wiring operation is reduced to a marked degree.

A more specific object of the invention is to provide a speed clamp of the character described that will be particularly designed to be incorporated in a conventional outlet box, whether it be the ordinary, rectangular electrical wall box or, alternatively, the cable-type octagonal box.

Still another object of importance is to provide a speed, clamp of the character stated that will be manufactured from a single piece of slightly springable sheet metal material, thus to provide a clamp that will be of sufficiently low cost to justify its commercial production. It is proposed, in this regard, to form the clamp in such a manner that it can be blanked out in a simple stamping operation, and produced in large quantities by mass production methods.

A further object of importance is to provide a clamp of the character described that can be swiftly mounted in an outlet box during manufacture of the outlet box.

Another object of importance is to form the speed clamp in a manner such that it can be incorporated in outlet boxes of various types as indicated above, without requiring any more than a minimum amount of modification or redesign of the box.

Still another object of importance is to form the clamp in such a manner that the opposite ends thereof will define individual clamping members, thus permitting each clamp to grip side-by-side wires or cables extended through the conventionally located knockout holes of the outlet box.

Summarized briefly, the invention comprises a clamp formed from a single piece of sheet metal material having springable characteristics. The clamp is formed along one edge thereof with a flange adapted to abut against the adjacent wall of the outlet box, with the clamp in position over the laterally spaced knockout holes of the box. At its opposite ends, the clamp has spring members, which are so designed as to be biased outwardly from the wall of the outlet box responsive to insertion of a cable between a selected spring member and said wall. Between the spring members, a lip or flange portion is provided, which bears against the wall of the outlet box in cooperation with the previously mentioned flange. The clamp is held in place with a screw, that need not be loosened or otherwise acted upon during the actual operation of inserting cables in the electrical outlet box.

Other objects will appear from the following description, the claims appended thereto, and from the annexed drawing, in which like reference characters designate like parts throughout the several views, and wherein:

Figure 2:
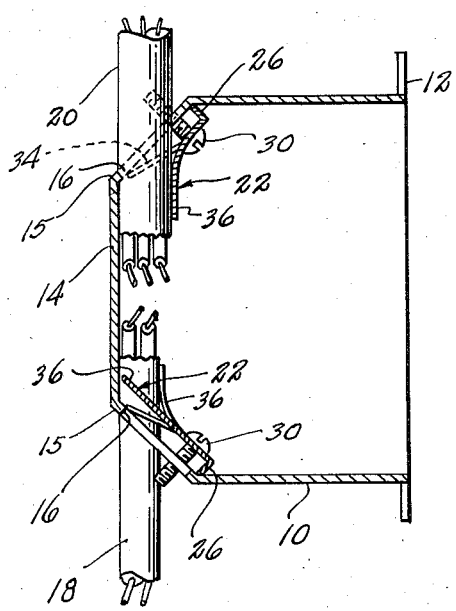
Figure 2 is a longitudinal sectional view through the outlet box substantially on line 2—2 of Figure 1.

Referring to the drawings in detail, designated at 10 is a conventional wall type electrical outlet box. As will be apparent from the description to be provided hereinafter, the invention can be applied with equal facility to an octagonal outlet box, this being considered sufficiently obvious as not to require special illustration herein.

In any event, the outlet box includes the usual mounting ears 12 disposed at the open front of the box. The box also includes the usual back wall 14, and the sloped wall portion 15 merging into the back wall and disposed obliquely to the plane of the back wall. Formed in the wall portion 15 are knockout openings 16, which are exposed responsive to removal of areas of the wall portions 15 defined by weakened lines.

The cables to be clamped are shown at 18, 20 respectively and can be of various thickness or diameters.

The parts so far described are all conventional, and do not per se constitute part of the present invention.

The device constituting the invention has been generally designated at 22. This is formed from a single piece of sheet metal material including a generally rectangular body 24 adapted to overlie substantially the full area of the inner surface of an associated sloped wall portion 15. Body 24, along one of its longitudinal edges, has a flange 26, which is disposed approximately perpendicularly to the general plane of the body 24. Adjacent flange 26, there is formed a screw-receiving opening located medially between opposite ends of the body.

When the clamp is mounted in the outlet box, a screw 30 is extended through the opening 28, and is threadedly engaged in an opening formed in the slope wall portion 15. This is done during manufacture of the outlet box, and the screw 30, at this time, is tightened against the clamp so as to fixedly engage the clamp within the outlet box. Thereafter, during the actual wiring operation, it is not necessary to loosen the screw, since the clamp is already in position to grip the inserted cable 18 or 20 as the case may be.

Figure 3:
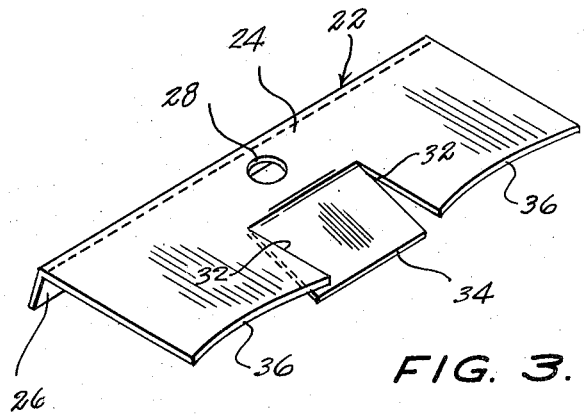
Figure 3 is an enlarged perspective view of one of the speed clamps per se.

Formed in the body 24 are transverse, longitudinally spaced slits 32, these extending inwardly from that longitudinal edge of body 24 opposite the edge on which flange 26 is formed. Slits 32 extend inwardly for slightly more than half the width of the body 24, the inner ends of the slits terminating short of the opening 28, the slits being symmetrically located at opposite sides of said opening as shown in Figure 3.

Formation of the slits 32 defines between the same a lip 34. Lip 34 is bent out of the general plane of the body 24, so as to be disposed at the same side of said plane as the flange 26. The lip is bent so as to lie obliquely to the plane of body 24, as shown to best advantage in Figure 3.

Figure 1:
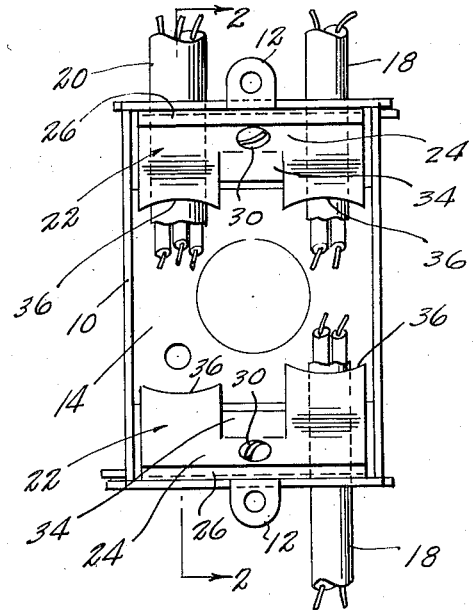
Figure 1 is an elevational view of an electrical outlet box equipped with a pair of speed clamps according to the present invention, a plurality of cables being shown in clamped position, the box being shown as it appears when viewed from the right of Figure 2.

The provision of the slits also defines, between each slit and the adjacent end of the body 24, a clamping tongue 36, the free edge of which is slightly, arcuately recessed as best shown in Figure 1. The clamping tongues 36, due to the inherent springability of the material of which the clamp is formed, are adapted to be biased outwardly from the wall portion 15 by the inserted cable, as shown in Figure 2.

In use of the device, one need merely, as will be obvious, insert a cable 18 or 20 through a knockout opening 16. The cable, when inserted, slides between the tongue 36 and the wall 14, pressing the tongue outwardly from the back wall against the restraint of the spring tension of the tongue. As a result, after the cable is inserted, the tongue will exert a clamping action thereagainst, and will tend to bite into the surface of the cable, so as to prevent retrograde movement of the cable. The cable may thus be readily inserted into the outlet box, and will be held securely within the outlet box by the clamping tongue 36, without possibility of its being pulled rearwardly in a direction outwardly from the box. The wiring within the box may be thus completed, and it will be seen that it is not necessary at any time to loosen and retighten the clamping screws in the manner required in the case of conventional outlet boxes.

It may be noted that when the clamp is initially mounted within the outlet box, the flange 26 will abut against the wall portion 15, as shown in Figure 2, while the free edge of the lip 34 will also abut against the wall portion, at a location spaced from the point at which flange 26 engages said wall portion. As a result, the inner ends of the tongues are spaced outwardly from the wall portion, to facilitate the insertion of the cable through the knockout opening into position between the free end of the tongue 36 and back wall 14.

Obviously, there may be certain variations in shape or measurements, required to permit the speed clamp to fit the boxes made by different manufacturers, or boxes of different types. In every instance, however, the principles of the invention will be retained.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, and the means presently devised to carry out said principles, it being considered that the invention comprehends any minor change in construction that may be permitted within the scope of the appended claims.

What is claimed is:

1. A cable clamp for an electrical outlet box of the type having a back wall and a sloped wall portion that merges into and is disposed obliquely to the plane of the back wall, comprising: an elongated, flat body of sheet material adapted for overlying substantially the full area of said wall portion; a narrow flange integrally formed upon and extending along one longitudinal edge of the body, said flange projecting angularly to the plane of the body wholly at one side of said plane of the body, said body having midway between its ends a fastener-receiving opening in close proximity to said edge, the body having two transverse slits extending inwardly from the other longitudinal edge thereof at opposite sides of and symmetrically with respect to said fastener-receiving opening, forming a spacer lip between the slits and clamping tongues at opposite sides of the lip, said tongues lying in said plane of the body and extending the full distance between the slits and the respective end edges of the body, said lip lying in a plane oblique to that of the body at the same side of said plane of the body as the flange, for engagement of the flange and lip against said wall portion, to thereby space the tongues away from the wall portion in position to cooperate therewith in gripping cables inserted therebetween.

2. A cable clamp for an electrical outlet box of the type having a back wall and a sloped wall portion that merges into and is disposed obliquely to the plane of the back wall, comprising: an elongated, flat body of sheet material adapted for overlying substantially the full area of said wall portion; a narrow flange integrally formed upon and extending along one longitudinal edge of the body, said flange projecting angularly to the plane of the body wholly at one side of said plane of the body, said body having midway between its ends a fastener-receiving opening in close proximity to said edge, the body having two transverse slits extending inwardly from the other longitudinal edge thereof at opposite sides of and symmetrically with respect to said fastener-receiving opening, forming a spacer lip between the slits and clamping tongues at opposite sides of the lip, said tongues lying in said plane of the body and extending the full distance between the slits and the respective end edges of the body, said lip lying in a plane oblique to that of the body at the same side of said plane of the body as the flange, for engagement of the flange and lip against said wall portion, to thereby space the tongues away from the wall portion in position to cooperate therewith in gripping cables inserted therebetween, said lip and flange having free edges constituting the portions of the same that engage against said wall portion, said free edges of the lip and flange being spaced equal distances from said plane of the body and being substantially in registration with the respective longitudinal edges of the body.

References Cited in the file of this patent

UNITED STATES PATENTS

| | | |
|---|---|---|
| 1,611,499 | Vaughn | Dec. 21, 1926 |
| 1,829,776 | Wright | Nov. 3, 1931 |
| 2,275,841 | Check | Mar. 10, 1942 |
| 2,424,829 | Keierleber | July 29, 1947 |
| 2,639,054 | Austin | May 19, 1953 |